UNITED STATES PATENT OFFICE.

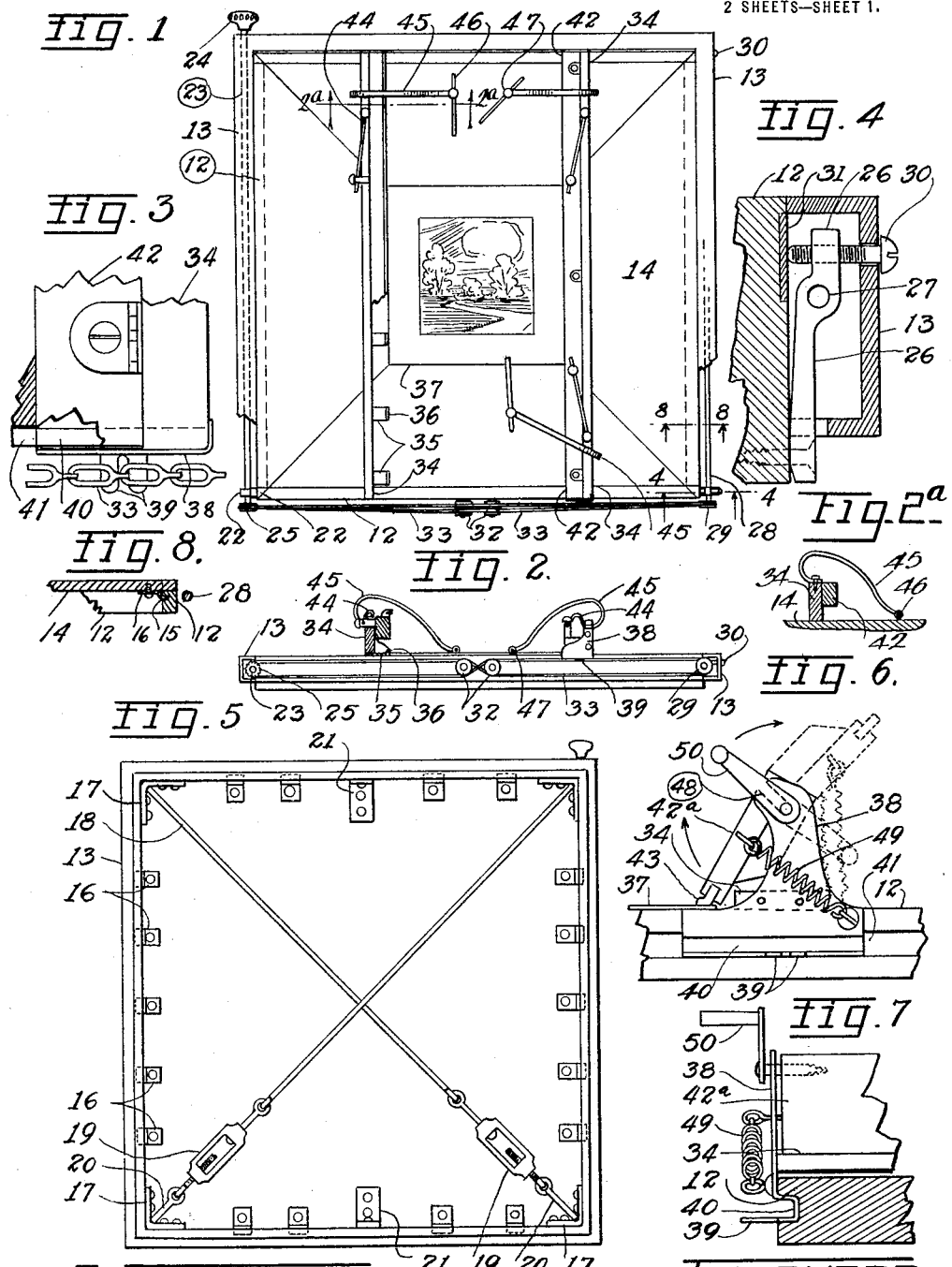

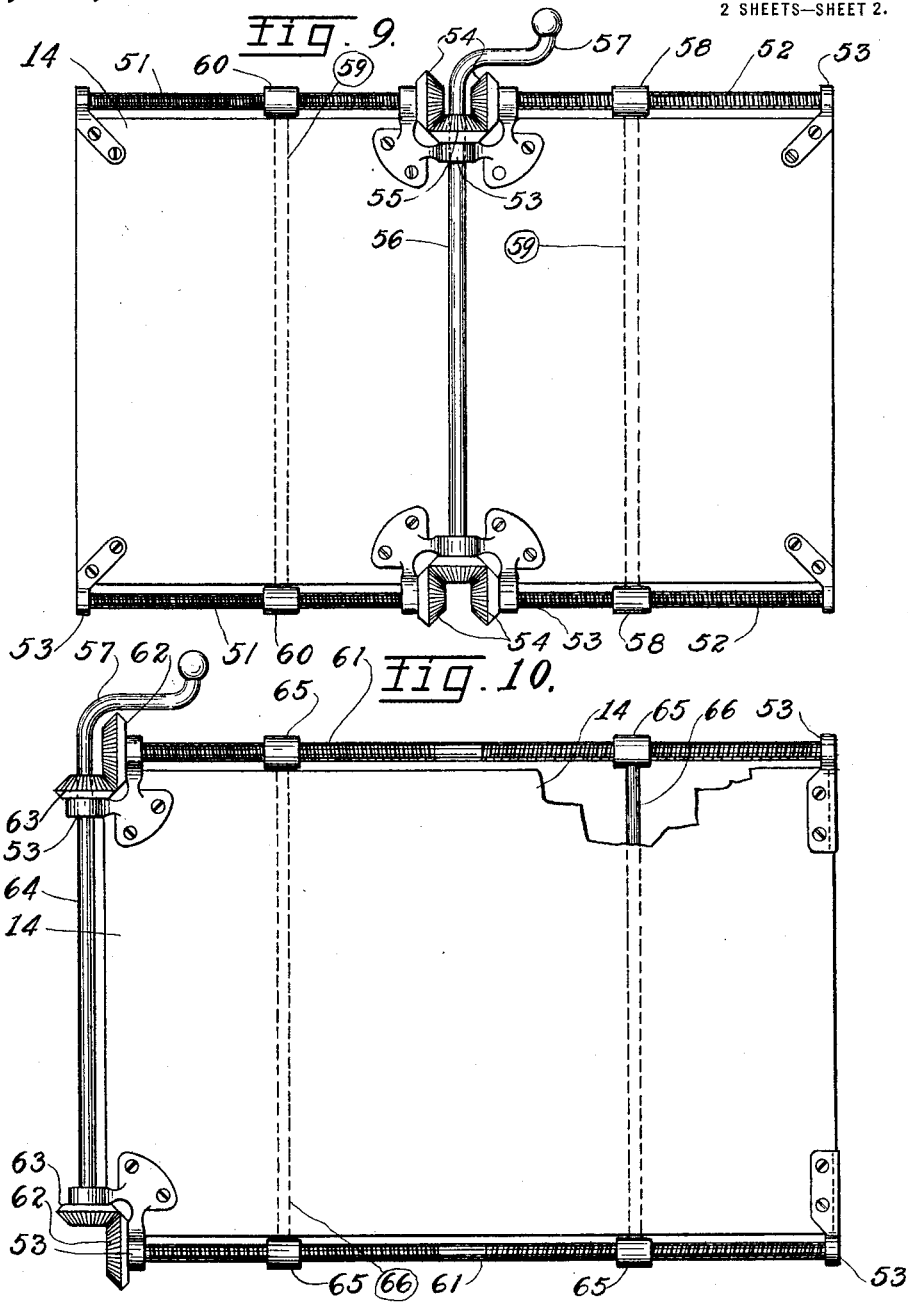

EMANUEL W. SWEIGARD, OF CHICAGO, ILLINOIS.

PHOTOGRAPHIC COPY-HOLDER.

1,147,196.   Specification of Letters Patent.   Patented July 20, 1915.

Application filed March 16, 1914. Serial No. 824,919.

*To all whom it may concern:*

Be it known that I, EMANUEL W. SWEIG-ARD, a citizen of the United States, and a resident of the city of Chicago, in the county of Cook and State of Illinois, have invented certain new and useful Improvements in Photographic Copy-Holders, of which the following is a specification.

This invention relates to improvements in a holder to be used for holding pictures of various kinds and of different sizes, in proper position and condition in front of a camera, for the purpose of reproducing the same thereby, and it consists in certain peculiarities of the construction, novel arrangement and operation of the various parts thereof, as will be hereinafter more fully set forth and specifically claimed.

The principal object of the invention is to furnish a photographic copy holder, which shall be simple and inexpensive in construction, strong and durable, proof against warping and otherwise more efficient in operation than such holders heretofore in general use.

Another object is to provide a copy-holder of the above named general character, which shall be so made that, if desired, it may be placed and permanently maintained in an upright position in alinement with the front of the camera and the field of the lens, in which position, the copy can be placed and secured thereon without the use of glue, paste, tacks and the like, or can be quickly removed therefrom, thus dispensing with the necessity of handling and changing the position of the holder every time a different copy is placed thereon, as in the old way, and besides, avoids marring or soiling the board with tackholes and paste.

A further object is to provide the holder with means for clamping and holding the copy against the face of the holder in such a manner as to prevent "buckling," and which, when adjusted will automatically place and hold the copy in the center of the holder.

Other objects and advantages of the invention will be disclosed in the subjoined description and explanation.

In the accompanying drawings, which serve to illustrate an embodiment of the invention—Figure 1 is a face view of a photographic copy holder constructed according to one form of the invention and illustrating parts thereof broken away or removed to illustrate certain mechanism of the device; Fig. 2 is a bottom plan view partly in section of Fig. 1; Fig. 2$^a$ is a sectional view through a portion of the board, one of the movable clamping bars and one of the copy holding members taken on line 2$^a$—2$^a$ of Fig. 1, looking in the direction indicated by the arrows, and illustrating the pivotal connection at one of its ends of one of the spring arms used for assisting in holding the picture against the board; Fig. 3 is a greatly enlarged face view of a portion of one of the movable clamping bars and a part of one of the copy-holding members of said bars, showing them in engagement with a sprocket chain used for moving them back and forth over the holding board; Fig. 4 is a greatly enlarged sectional view taken on line 4—4 of Fig. 1 looking in the direction indicated by the arrows; Fig. 5 is a rear face view of the holder; Fig. 6 is a plan view of a portion of the frame of the holder, showing a modification in the construction of one of the movable clamping bars and a part of one of the copy-holding members of said bars; Fig. 7 is a side view thereof; Fig. 8 is a detail sectional view of a portion of the copy-holding board and a part of the frame showing means for connecting the same together; and Figs. 9 and 10 are rear face views of the copy-holding board, showing modified constructions in the means for advancing and retracting the clamps and holding members for the copy.

Like numerals of reference refer to corresponding parts throughout the different views of the drawings.

Referring now to Figs. 1, 2 and 5 of the drawings, the reference numeral 12 designates as a whole a rectangular frame, which may be made of any suitable size and material, and bordered externally with a channeled casing 13, which casing is preferably made of wood and secured to the outer surface of the frame 12, by means of screws or otherwise. Located between two of the parallel sides, say the top and bottom of the frame 12, is a copy-holding board 14, which is preferably made of good hard wood and of a single piece, with its front face perfectly smooth and flat. This board overlaps two of the parallel sides of the frame 12, which, in the present instance, are shown as the vertical sides thereof. The frame 12 is provided on its inner perimeter with a groove 15, into which grooves are extended the free ends of metal clips or brackets 16, a series of which are secured to the rear surface of the board 14, near its edges. At each of its inner corners the frame 12 has secured thereto an angle bracket 17, from two of which are extended diagonally across the frame rods 18, which are connected by means of turn-buckles 19 to eye-rods 20, one of which is secured to each of the brackets 17 at the corners of the frame 12, opposite the corners to which the rods 18 are connected. At about midway between its side edges at its top and bottom the board 14 is rigidly connected to the upper and lower portions of the frame 12 by means of angle brackets 21, which will hold the frame 12 and board 14 together at said points, but it will be understood that as the clips or brackets 16 loosely engage the frame 12 compensation for shrinkage or expansion, due to the action of the atmosphere on the board 14 will be afforded, thus preventing the board warping.

Journaled in suitable bearings 22 at one side of the frame 12, near its upper and lower ends, is an operating rod 23, which may be provided with a knob or handle 24, at one of its ends, used for turning the same. Near each of its ends the operating rod 23 has mounted thereon a small sprocket wheel 25, which is inclosed by the channeled casing 13 at each end of the frame. Secured to the opposite side of the frame 12, near each of its ends is a bearing member 26, each of which is provided with a transverse opening 27 for the reception of a rod or shaft 28, which has mounted thereon at each of its ends a grooved pulley 29.

As is clearly shown in Fig. 4, each of the members 26 is fastened near one of its ends to the frame 12 and is provided at its other end with a screw 30, which is extended through a suitable opening in the casing 13, and rests at its inner end against a plate 31 on the side of the frame. Journaled at the top and bottom, or each end of the frame 12, about midway between its sides, are a pair of double grooved pulleys 32, over which is passed an endless chain 33, which also extends around the sprocket wheels 25 and 29, at the ends of the shafts 23 and 28, at the top and bottom of the frame. By journaling the shaft 28 in the bearings 26, it is apparent that said bearings may be adjusted by turning the screws 30 in the proper direction to force the bearing outwardly or inwardly, as desired, thus affording means for taking up or increasing the slack in the chains 33, which are used for propelling the clamping bars 34, which bars are extended in parallelism across the board 14 from its top to its bottom. Each of these bars is provided on its inner surface with a series of inwardly extended projections 35, which have their free ends upturned as at 36 to rest against the edge of the copy 37, on which the picture to be reproduced is displayed. At each of its ends, each of the bars 34 is provided with a bracket 38, which has a pair of outwardly extended prongs 39 to engage the links of the chain 33 so that when said chain is moved around the pulleys 32 and sprocket wheels 25 and 29 the bars 34 will be advanced toward one another or separated, as may be desired. Each of the brackets 38 is provided on its surface opposite the prongs 39 with an extension 40, which fits into a groove 41 formed in each of the end pieces of the frame at the top and bottom thereof. Hinged to each of the bars 34 on the inner surface thereof is a holding-strip 42 for the copy 37, each of which holding-strips may be provided with felt 43 to rest against the copy and prevent marring the same.

As is clearly shown in Figs. 1 and 2 the strips 42 are connected to the bars 34 by means of torsion springs 44 which are used to hold the strips 42 in position against the copy 37, or, if desired, to hold them away from the picture or board as shown in the sectional part of Fig. 2 of the drawings. Pivotally secured at one of its ends to each of the bars 34 so as to be adapted to swing in a plane with the board 14 are one or more spring arms 45, which are bent over the strips 42 and have their free ends projected to near the face of the board 14. Each of the arms 45 is provided at its free end with an adjustable arm 46 to rest on the copy 37 so as to prevent the same buckling when a large copy is used. The arms 46 are adjustably connected to the arms 45 by swivels 47, or in any other suitable manner.

In Figs. 6 and 7 is shown a modification in the construction of the holding-strips for the copy, which consists in employing a strip 42ª, which extends from each of the brackets 38 and is journaled in the upper portions of said brackets, the latter being provided with suitable openings 48 for said journals. In this modification each of the strips 42ª is connected at one of its ends to the bracket 38 by means of a spring 49, which will act to hold the strip 42ª against the copy 37, as shown by full lines in Fig. 6, but when it is desired to raise the strip 42ª out of the way of the copy 37, it can be done by means of a crank handle 50 connected to one end of said strip, when the parts will assume about the position shown by dotted lines in Fig. 6 of the drawings.

By reference to Figs. 1 and 2 of the drawings, it will be seen that the endless chain 33 passes over one of the pulleys 32, and under the other pulley 32, and thence around the sprocket 29, and from thence over the pulley 32 adjacent to said sprocket, and then under the other pulley 32, and from thence around the sprocket 25 on the operating shaft. This arrangement is carried out at each end, or the top and bottom of the frame, and it will be understood that by turning the operating rod 23 in the proper direction, the clamping bars 34 will be caused to approach each other so as to press the upturned portions 36 of the projections 35 against the copy, and thus hold it in the proper position on the board, when the holding strips can be turned down so as to firmly secure the copy in place. By turning the operating rod 23 in the opposite direction, it is obvious that the clamping bars 34 will be separated or moved from each other, so as to permit of the insertion therebetween of a copy sheet of a larger size, if desired.

In Fig. 9 of the drawings, is shown a modification in the means for advancing and retracting the clamping bars, which consists in employing at opposite sides of the board 14 a pair of screw shafts 51 and 52, which are journaled on suitable brackets 53 secured to the board. The inner end of each pair of the shafts 51 and 52 have mounted thereon beveled gears 54, which mesh with beveled gears 55 mounted on an operating shaft 56 near each of its ends, which shaft is provided with a handle 57 for turning the same, and is also journaled in suitable brackets 53 secured to the board. Mounted on each of the screw shafts 52 is a screw threaded collar 58 which are connected together by means of a rod or bar 59, which extends across the face of the board 14, from its top to its bottom, as shown. Each of the screw shafts 51 has mounted thereon a screw threaded collar 60, which are connected together by means of a rod 59 extended across the face of the board 14 in parallelism with the rod 59 first above mentioned. Each of the rods 59 may be equipped with a clamping bar 34 and holding strip 42 of the construction shown in Figs. 1 and 2 and above described, or each of them may be equipped with clamping bars and holding strips of the construction shown in Figs. 6 and 7 of the drawings.

In Fig. 10 is shown another modification in the means for advancing and retracting the clamping-bars, which consists in the employment of a shaft 61, journaled at the opposite edges of the board 14, and each having right and left screw threads thereon. Each of the shafts 61 is provided at one of its ends with a beveled gear 62, which gears mesh with beveled gears 63 mounted on an operating shaft 64 near each of its ends, which latter shaft is vertically journaled on brackets 53 at one side of the board and may be provided with a handle 57 for turning the same. The shafts 61 are each provided with collars 65 one of which engages the right screw threads and the other the left screw threads, on each of said shafts. These collars are connected together by means of rods 66 extended in parallelism across the face of the board 14 and said rods may be equipped with clamping bars and holding strips of any desired construction.

By using the diagonal rods 18 and turnbuckles 19 it is evident that should the frame warp or get out of alinement, this defect can be corrected by tightening one or the other of the turn buckles.

Having thus fully described my invention, what I claim as new and desire to secure by Letters Patent, is—

1. In a photographic copy holder, the combination with a holding-board, of a pair of clamping-bars for the copy extended in parallelism across the face of said board, a spring actuated holding strip secured to each of said bars and extended longitudinally therewith, and means mounted on the board and connected to said bars for simultaneously moving them toward and from each other.

2. In a photographic copy holder, the combination with a holding-board, of a pair of clamping-bars for the copy extended in parallelism across the face of said board and each provided with a series of projections on its portion adjacent to the board to engage the copy, a spring actuated holding strip or member mounted along side of each of said bars and adapted to engage the copy when turned inwardly, and means connected to each of the ends of said bars and mounted on the board for moving the bars toward and from each other.

3. In a photographic copy holder, the combination with a holding-board, of a pair of clamping-bars for the copy extended in parallelism across the face of said board, an operating rod journaled at one edge of the board in parallelism with said bars, a sprocket wheel mounted on said rod near each of its ends, another rod or shaft journaled at the opposite edge of the board from that on which the operating rod is mounted, a sprocket wheel mounted on the last named rod near each of its ends, a pair of double grooved pulleys journaled on the board about midway between said rods and at opposite ends of the board, an endless chain engaging the sprocket wheels on each end of each of said rods and the interposed grooved pulleys, a bracket secured to each end of each of the clamping-bars and each of said brackets having means to engage said chains.

4. In a photographic copy holder, the combination with a holding board, of a pair of clamping-bars for the copy extended in parallelism across the face of said board, an operating rod journaled at one edge of the board in parallelism with said bars, a sprocket wheel mounted on said rod near each of its ends, another rod or shaft adjustably journaled at the opposite edge of the board from that on which the operating rod is mounted, a sprocket wheel mounted on the last named rod near each of its ends, a pair of idle pulleys journaled on the board at about midway between said rods and at opposite ends of the board, an endless chain engaging the sprocket wheels on the operating rod and sprocket wheels on the other rod and the said idle pulleys, a bracket secured to each end of each of the clamping-bars, and each of said brackets having means to engage said chains.

5. In a photographic copy holder, the combination with a rectangular frame having in its inner perimeter a groove, of a board located on said frame, a pair of angle brackets secured to said board and frame at opposite sides thereof, a series of brackets secured to the board and each having an extension projected into the groove of the frame, connections extended diagonally from one corner of the frame to its other, and a turn buckle comprising a part of each of said connections.

EMANUEL W. SWEIGARD.

Witnesses:
CHAS. C. TILLMAN,
A. S. PHILLIPS.

Copies of this patent may be obtained for five cents each, by addressing the "Commissioner of Patents, Washington, D. C."